T. L. VALERIUS.
FEEDING AND MIXING DEVICE.
APPLICATION FILED MAY 28, 1908.
988,412.
Patented Apr. 4, 1911.
2 SHEETS—SHEET 2.
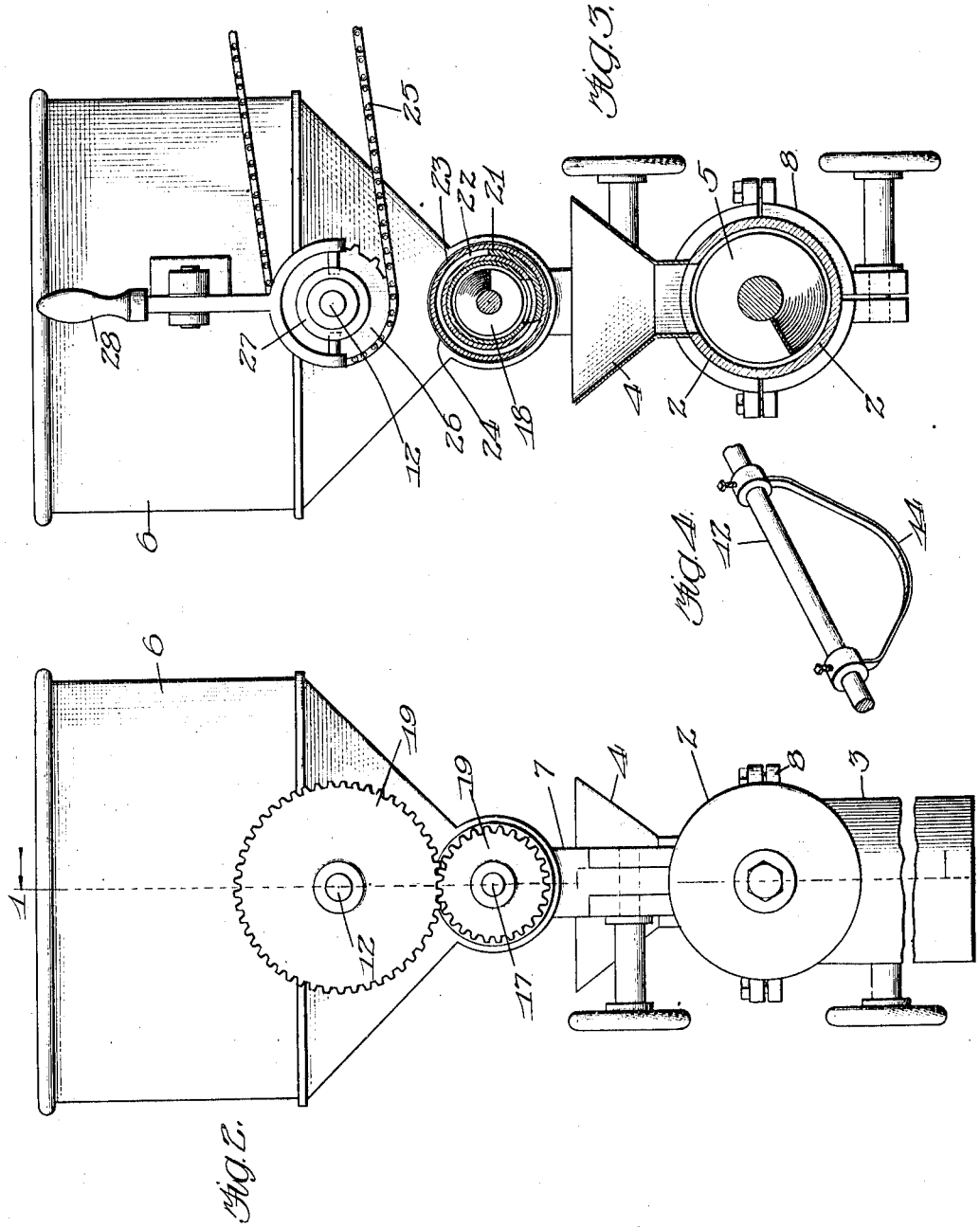

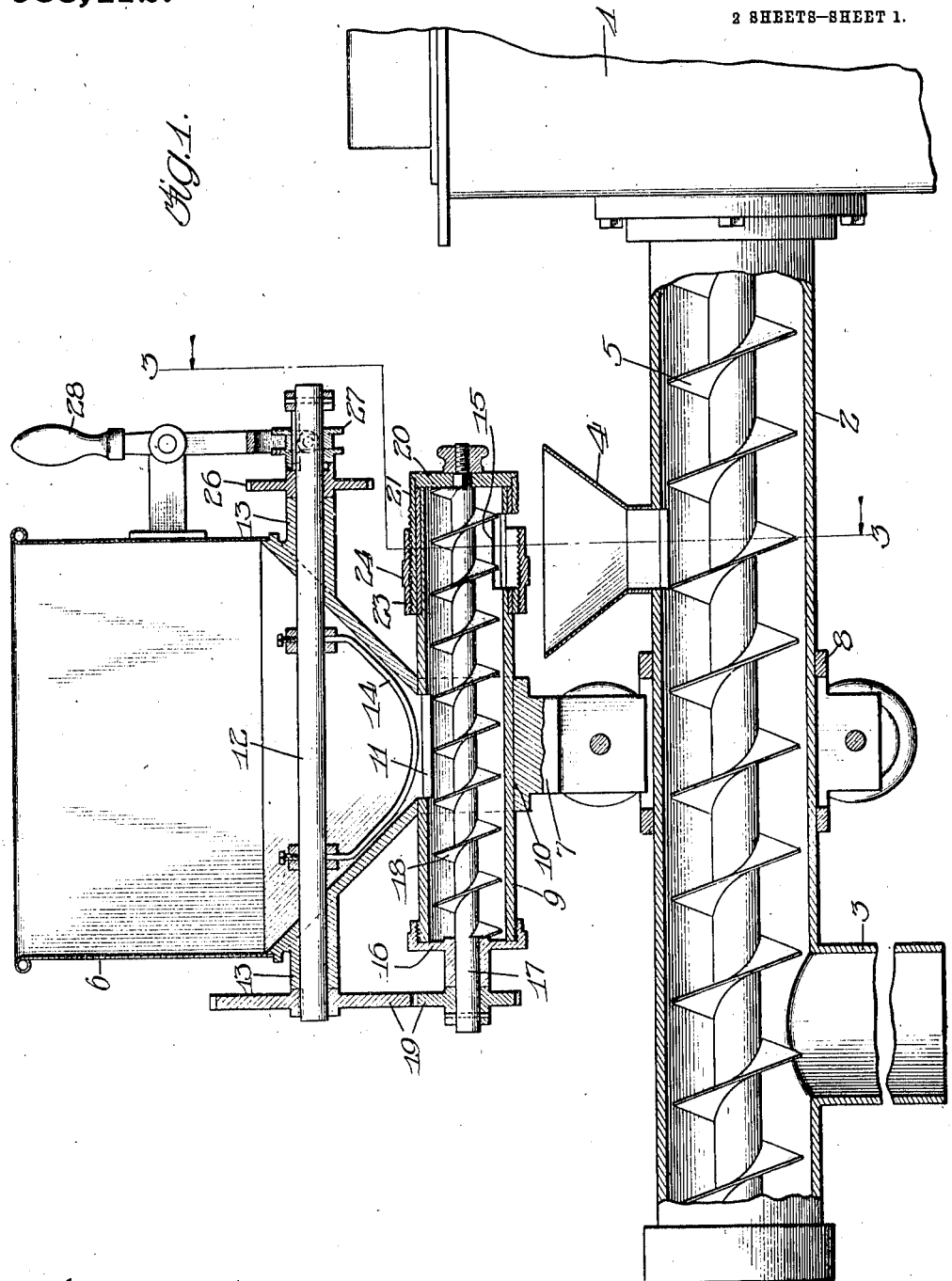

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

FEEDING AND MIXING DEVICE.

988,412. Specification of Letters Patent. Patented Apr. 4, 1911.

Application filed May 28, 1908. Serial No. 435,543.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Feeding and Mixing Devices, of which the following is a specification.

This invention relates to means for feeding material in predetermined quantities, and especially material in a more or less fluid state, and consisting largely of individual masses or lumps and shreds, such as shredded or partly crushed fruits.
It is one of the objects of the invention to feed such material without further crushing or shredding it.

The invention also relates to a means for mixing crushed or shredded fruit with ice-cream or similar material.

I shall herein describe my invention as embodied in an ice-cream making apparatus, without thereby intending to limit the invention to such use.
In the accompanying drawings, Figure 1 is a vertical central section through an embodiment of my invention as applied to an ice-cream freezer, the view being taken upon the plane of dotted line 1 of Fig. 2. Fig. 2 is an end elevation taken from the left-hand side of Fig. 1. Fig. 3 is a section on line 3 3 of Fig. 1. Fig. 4 is a perspective view of the agitator.

The embodiment selected for illustration comprises an ice-cream freezer 1 of any suitable character, but preferably of the continuous-operation type, such, for example, as the machine disclosed in Patent No. 899,928, issued September 29, 1908. The discharge means for the freezer 1 is herein shown as comprising a screw conveyer casing 2 communicating at one end with the freezer, the other end of said casing being closed, and an outlet 3 being provided in one side of the casing near its closed end. In the upper side of the casing 2 and preferably near the inlet end thereof is a flavor-receiving funnel or hopper 4 communicating with the interior of the conveyer casing. Rotatably supported in the conveyer casing 2 is a conveyer screw 5 adapted to feed the partially frozen cream to the outlet 3. The means for feeding crushed fruit or other flavoring material to the hopper 4 comprises, in this instance, a can or hopper 6 having at its lower end a supporting standard 7 by means of which said flavor-feeding device is supported upon the conveyer casing 2, preferably through the medium of a clamp 8
(Fig. 3). Operatively associated with the hopper 6 is a conveyer device, which is herein shown as comprising a screw conveyer casing 9 fixed in and extending through an opening 10 in the supporting stem 7.

11 is an opening establishing communication between the hopper 6 and the conveyer casing 9. To prevent the fruit from clogging said opening, I may provide an agitator which is herein shown as comprising a shaft 12 rotatably supported in bearings 13 upon the hopper 6, and a bail 14 fixed to said shaft within the hopper.

In the lower side of the conveyer casing 9 at a point above the funnel 4 is an outlet opening 15. One end of the conveyer casing 9 is closed by a wall 16 which provides a bearing for the journal 17 of the conveyer screw 18. Said screw may be driven from the shaft 12 through intermeshing gears 19 fixed upon said shaft and said journal. To the discharge end of the conveyer screw 18 is fixed a disk 20 which serves as one end wall of the conveyer casing 9, and has fixed thereto a valve member in the form of a sleeve 21 having an opening 22 therein arranged to register with the outlet opening 15 in the conveyer casing 9.

In order to permit of regulating the discharge of the material through the outlet opening 15, I provide an adjusting means which may consist of a sleeve or nut 23 mounted upon and having a screw-thread connection with the sleeve 21, said sleeve 23 having suitable means by which it may be manually rotated, as, for example, a knurled surface 24. The sleeve 23 may be caused to overlie more or less of the opening 22 in the sleeve 21 and thereby regulate the quantity discharged through said opening in each revolution of the conveyer screw 18.

The mechanism of the flavor feeder may be driven by means of a chain 25 passing over a sprocket wheel 26 loose upon the shaft 12, said chain preferably being driven from a shaft of the freezer 1, in order that the rate of operation of the flavor feeder may be properly proportioned to the rate of operation of the freezer.

27 is a clutch member having a spline connection with the shaft 12 and movable into and out of clutch connection with the sprocket wheel 26 by means of a clutch lever 28.

In operation the cut or shredded pineapple, the partially crushed strawberries, or other fruit placed in the hopper 6 passes through the opening 11 into the conveyer casing 9 and is moved toward the outlet 15 by the conveyer screw 18. Said outlet is opened once in each revolution of the screw by the cylindrical valve member 21, a quantity of the crushed fruit dropping through the outlet opening 15 when the opening 22 in said valve member registers with said outlet opening. The fruit falls into the funnel or hopper 4, whence it flows into the conveyer casing 2 through which a stream of partially frozen cream is being moved by the conveyer 5. In its passage through the conveyer casing 2 the fruit is thoroughly mixed with the cream, but without further crushing or shredding of said fruit.

It will be understood that the fruit or flavor is a relatively small part of the finished ice-cream, and therefore that the feed from the container 6 must be relatively slow. I have solved the problem of obtaining such a slow feed without the use of a small outlet opening, which would become clogged with the fruit, by providing a relatively large outlet opening and means for obtaining a periodical discharge through said opening.

In certain of the following claims I have used the word "flavor" to indicate crushed or shredded fruit or any other flavoring material.

I claim as my invention:

1. The combination with an ice cream freezer having a continuously-operating cream-discharging conveyer, of means for intermittently adding a quantity of crushed fruit to the stream of cream passing through said conveyer, the latter being adapted to mix the crushed fruit with the ice cream.

2. The combination, with an ice cream freezer having a discharge means, of means for placing lumpy flavoring material in said discharge means.

3. The combination, with an ice cream freezer adapted to partially freeze the cream and provided with a continuously-operating screw conveyer for discharging the partially frozen cream, said conveyer having a crushed-fruit inlet, of means for intermittently placing a quantity of crushed fruit in said inlet, the conveyer being adapted to mix the crushed fruit with the partially frozen cream.

4. A flavor-feeding attachment for ice-cream freezers comprising a container, means for mounting said container in operative relation to the freezer, bearings on said container, a shaft mounted in said bearings, an agitator on said shaft in said container, a conveyer casing below and supported with said container and communicating therewith, a conveyer screw in said casing, a driving connection between said shaft and said conveyer screw, a valve device driven by said conveyer screw for controlling the discharge from said conveyer, and means for driving said shaft.

5. The combination with a continuous-discharge ice-cream freezer having a conveyer casing communicating at one end with said freezer and having an outlet at its other end, and a receiving funnel or hopper mounted on said casing between the ends thereof, of a crushed-fruit feeder comprising a container supported by and above said conveyer casing, an agitator in said container, a screw conveyer casing communicating with said container and having an outlet opening above said receiving hopper, a conveyer screw in the second mentioned conveyer casing, a valve device actuated by the last mentioned conveyer screw for controlling the discharge through said outlet opening, and means for driving said agitator and said screw conveyer.

6. The combination, with an ice cream freezer, of a receptacle for containing lumpy flavoring material, and means for conducting flavoring material from said receptacle to a portion of the freezer containing frozen cream.

THEODORE L. VALERIUS.

Witnesses:
IRVING R. HIPPENMEYER,
T. W. CHASE.